United States Patent
Bruestle

[11] Patent Number: 6,029,626
[45] Date of Patent: Feb. 29, 2000

[54] ULEV CONCEPT FOR HIGH-PERFORMANCE ENGINES

[75] Inventor: Claus Bruestle, Gerlingen, Germany

[73] Assignee: Dr. Ing. h.c.F. Porsche AG, Weissach, Germany

[21] Appl. No.: 09/064,763

[22] Filed: Apr. 23, 1998

[30] Foreign Application Priority Data

Apr. 23, 1997 [DE] Germany .......................... 197 16 916

[51] Int. Cl.[7] .................................................. F02P 5/15
[52] U.S. Cl. .................................. 123/406.45; 123/90.17
[58] Field of Search ........................ 123/406.45, 406.12, 123/90.17

[56] References Cited

U.S. PATENT DOCUMENTS

| | | | |
|---|---|---|---|
| 4,961,406 | 10/1990 | Burandt | 123/90.15 |
| 5,074,260 | 12/1991 | Yagi et al. | 123/90.16 |
| 5,107,802 | 4/1992 | Yagi et al. | 123/90.15 |
| 5,168,851 | 12/1992 | Itoyama et al. | 123/399 |
| 5,398,502 | 3/1995 | Watanabe | 123/284 |
| 5,622,144 | 4/1997 | Nakamura et al. | 123/90.15 |

*Primary Examiner*—Tony M. Argenbright
*Assistant Examiner*—Arnold Castro
*Attorney, Agent, or Firm*—Evenson, McKeown, Edwards & Lenahan, PLLC

[57] ABSTRACT

An internal combustion engine includes an adjusting device for an exhaust camshaft and an ignition control device. In order to provide an internal combustion engine in which pollutant emissions can be further reduced and stricter limits on pollutant emissions can be met, an adjusting device provided for the intake camshaft is controlled in a partial load range in such fashion that the exhaust camshaft is retarded. At the same time, an ignition control device retards the ignition timing point.

8 Claims, 4 Drawing Sheets

ULEV CONCEPT FOR HIGH-PERFORMANCE ENGINES

BACKGROUND AND SUMMARY OF THE INVENTION

This application claims the priority of German Application No. 197 16 916.3, filed Apr. 23, 1997, the disclosure of which is expressly incorporated by reference herein.

The invention relates to an internal combustion engine and, more particularly, to an internal combustion engine having an adjustment device for an exhaust camshaft, an ignition device, and a control device for controlling the adjustment device and the ignition device, as well as a method for operating an internal combustion engine.

An important development goal in modern internal combustion engines is to reduce pollutant emissions. Previous development activities had focused particularly on optimization of the exhaust scrubbing system. Modern exhaust scrubbing systems have since achieved pollutant conversion rates of over 97% so that further reduction of pollutant emissions by exhaust treatment systems is no longer possible.

Hence the goal of the invention is to provide an internal combustion engine as well as a method for operation of an internal combustion engine by which pollutant emissions can be further reduced and stricter limits for pollutant emissions can also be met, like those required for example for ultra low emission vehicles, or ULEV.

This goal is achieved according to the invention by an internal combustion engine and, more particularly, by an internal combustion engine having an adjustment device for an exhaust camshaft, an ignition device, and a control device for controlling the adjustment device and the ignition device. The control device retards the exhaust camshaft in a partial load range of the engine and retards an ignition timing point of the ignition device. The invention is based on the discovery that a definite decrease in raw emissions from an internal combustion engine is necessary for further reduction of pollutant emissions and for meeting stricter limits.

According to the invention, it is proposed to control a device provided for adjusting the exhaust camshaft in a partial load range in such fashion that the exhaust camshaft is retarded. At the same time, an ignition control device ensures that the ignition timing is retarded. Shifting the ignition timing results in a further decrease in HC emissions. At the same time, the reduced specific fuel consumption achieved by shifting the exhaust camshaft is compensated once again. On the whole, however, the specific HC emissions of the internal combustion engine are decreased significantly by combining these two measures.

Advantageous improvements on the invention are described herein.

An especially advantageous design for the two measures described above can be achieved by the ignition timing being retarded to the point where the improvement in specific fuel consumption achieved by adjustment of the exhaust camshaft is again essentially compensated. In this design, a significant reduction in HC emissions is achieved without specific fuel consumption being increased. At the same time, retardation of the ignition timing increases the exhaust temperature, resulting in faster heating of an exhaust system connected downstream from the engine.

Raw emissions can be further reduced by using an adjusting device for the intake camshaft. By advancing the intake camshaft in addition to adjusting the exhaust camshaft as described above, both the specific HC emissions and the specific fuel consumption can be further reduced. Once again, for optimum reduction of HC emissions, the ignition timing can be adjusted so that maximum reduction of HC emissions is achieved while keeping specific fuel consumption constant.

A change in the stroke of the intake camshaft, which is also provided, provides an additional opportunity for reducing raw emissions from the engine, since when the valve stroke is shorter, the intake means can be advanced even further for geometric reasons.

The two additional measures for influencing the intake camshaft have the goal of bringing the overlap range between the exhaust and intake valves into an optimum position (that is, the range in which the intake and exhaust valves are opened simultaneously) as well as the point in time when the intake valves close. This optimum position depends upon the combustion conditions within the engine and therefore must be determined individually for every engine. In particular, if the optimum value of the overlap range is exceeded, the combustion process deteriorates rapidly and thus produces a sudden rise in raw emissions. As a result, limits are imposed on the influence exerted on the intake camshaft.

Other objects, advantages and novel features of the present invention will become apparent from the following detailed description of the invention when considered in conjunction with the accompanying drawings.

DETAILED DESCRIPTION OF THE DRAWINGS

Figure 1:
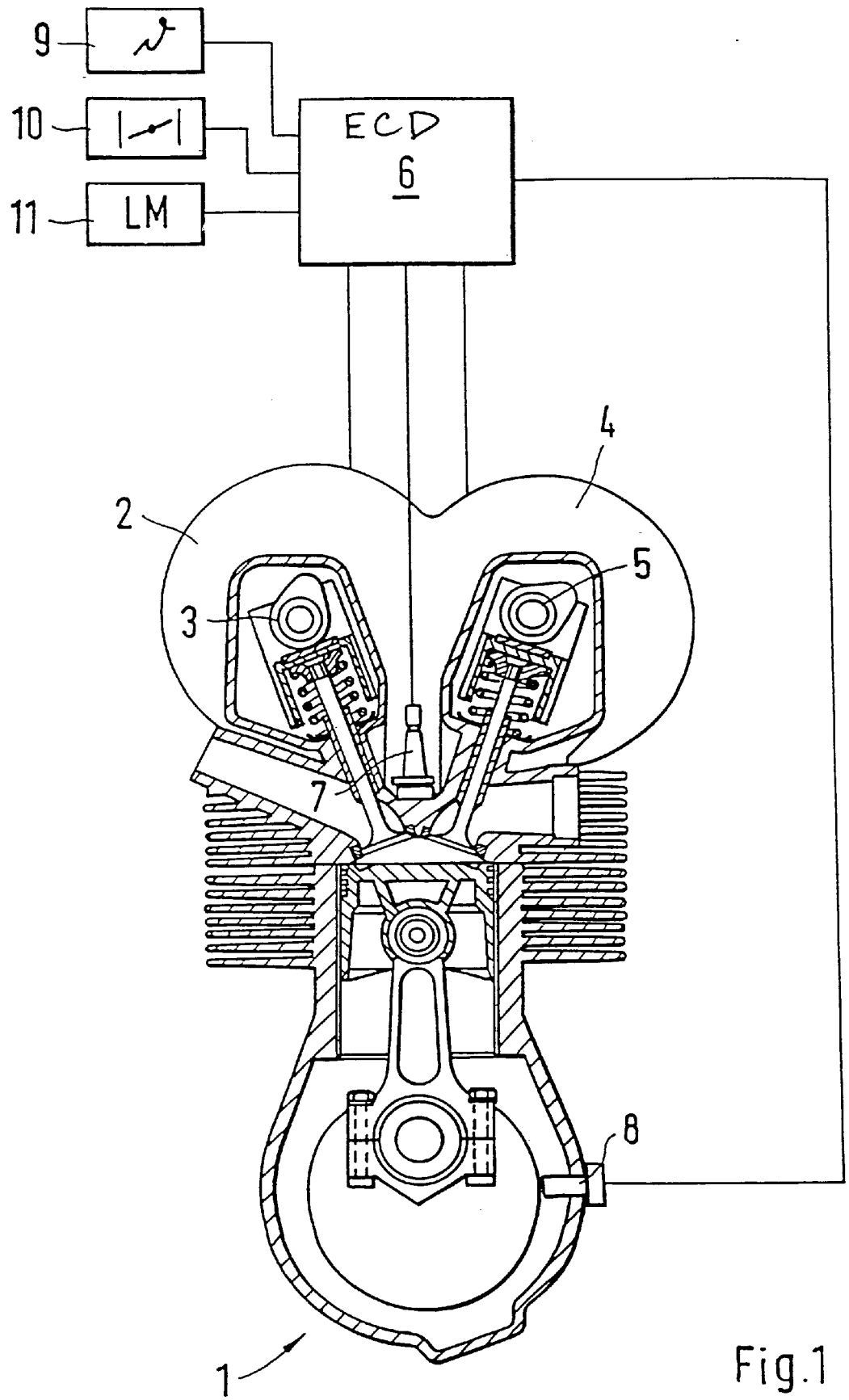
FIG. 1 is a cross-sectional view through an internal combustion engine.

An internal combustion engine 1 is provided with a first adjusting device 2 for an intake camshaft 3 as well as a second adjusting device 4 for an exhaust camshaft 5. An engine control device 6 controls first adjusting device 2 as well as second adjusting device 4. In addition, an ignition device 7 of engine 1 is likewise controlled by engine control device 6. Since adjusting devices 2, 4 and ignition device 7 are controlled as a function of one another, as described below, common control by a single engine control device is especially simple. To control adjusting devices 2, 4 and ignition device 7, engine control device 6 receives and processes, among others, signals from a crankshaft angle sensor 8, a temperature sensor 9, a throttle valve sensor 10, and a mass air flow meter 11.

Figure 2:
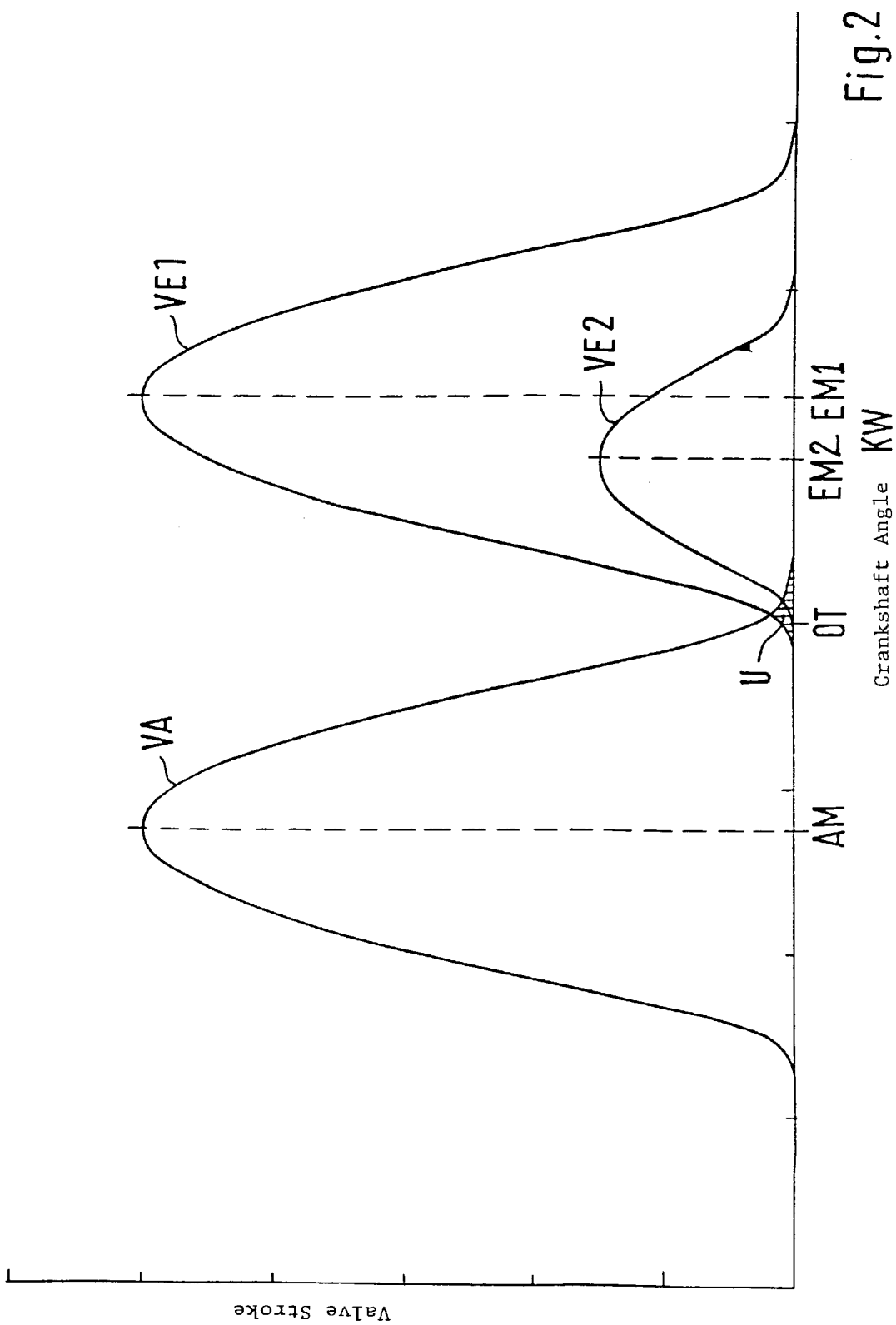
FIG. 2 is a graph of the adjustment ranges of the exhaust valves and intake valves.

The effect of second adjusting device 4 is shown in the graph in FIG. 2 for the control times of exhaust camshaft 5. The valve stroke, i.e. the stroke VA of exhaust camshaft 5, is plotted as a function of crankshaft angle KW. The top dead center point is marked OT; at this point, crankshaft angle KW becomes zero. The largest value for stroke VA is marked as the exhaust average AM. A retardation of exhaust camshaft 5 is represented in FIG. 2 as a shift of curve VA to the right.

The operation of engine control device 6 with respect to controlling second adjusting device 4 is described in greater detail below with reference to the graph shown in FIG. 3. In this graph, the curves of specific fuel consumption are plotted as a function of specific HC emissions HC for various ignition times ZZP. In the graph, the areas of ignition timing ZZP are plotted from 50° before top dead center OT to 15° before top dead center OT. The three curves A, B, C shown in the graph differ in the angle of exhaust camshaft 5 as adjusted by means of second adjusting device 4: in curve A, an exhaust average AM of 154°, in curve B an exhaust average AM of 113, and in curve C an exhaust average AM of 102° crankshaft angle KW before top dead center OT are set. The graph is based on a constant rpm, in this case 2000 rpm, of engine 1 as well as a fixed angular position of first adjusting device 2 and hence of intake camshaft 5 as well.

Curve A shows for comparison the situation with an exhaust average of 154° crankshaft angle.

Curve B shows a setting of exhaust camshaft 5 selected as the result of optimization for minimum specific fuel consumption "be" and minimum specific HC emissions HC with internal combustion engine 1 at full load. As a result of this optimization, the setting of ignition angle ZZP of operating point B1 is obtained as well. For comparison of curves A, B, and C with one another, the values for the specific fuel consumption "be" and specific HC emissions HC for this operating point B1 are set at 100% each.

As can be seen from curve C, in the partial load operating range shown, there is still further potential for optimizing specific fuel consumption "be" and specific HC emissions HC by retarding exhaust camshaft 5. In the operating range shown in FIG. 3, operating point C1 appears to be optimum as far as specific fuel consumption "be" and specific HC emissions HC are concerned. However, on the basis of the knowledge that reduction of the raw emissions produced directly by engine 1 is of critical importance for a further decrease in total pollutant emissions from engine 1, including the exhaust system that is not shown, operating point C2 is set instead. At this operating point C2, the same specific fuel consumption is achieved as with operating point B1 set previously; at the same time, however, specific HC emissions HC are reduced by 30%. A comparison with operating point C1 shows that this represents a further 11% reduction in specific HC emissions HC.

In summary, then, engine control 6 sets the angular position of exhaust camshaft 5 and at the same time adjusts the position of ignition timing point ZZP so that specific HC emissions HC are reduced while keeping the specific fuel consumption "be" constant.

In addition, provision is made for influencing the position of intake camshaft 3 by first adjusting device 2. In the graph in FIG. 2, the control times of intake camshaft 3 are plotted as first stroke VE1 as a function of crankshaft angle KW. The largest value for stroke VE1 is marked as the first intake average EM1. Advancing intake camshaft 5 results in FIG. 2 in a shift of curve VE1 to the left. A device for reducing the stroke of intake camshaft 3 according to second curve VE2 for intake camshaft 3 is not shown in greater detail. In this case the maximum value for stroke VE2 is marked as second intake average EM2. The range in which curve VA of exhaust camshaft 5 as well as curve VE1 of intake camshaft 3 (or curve VE2 with a reduced stroke of intake camshaft 3) overlap, is marked as overlap range U.

Figure 3:
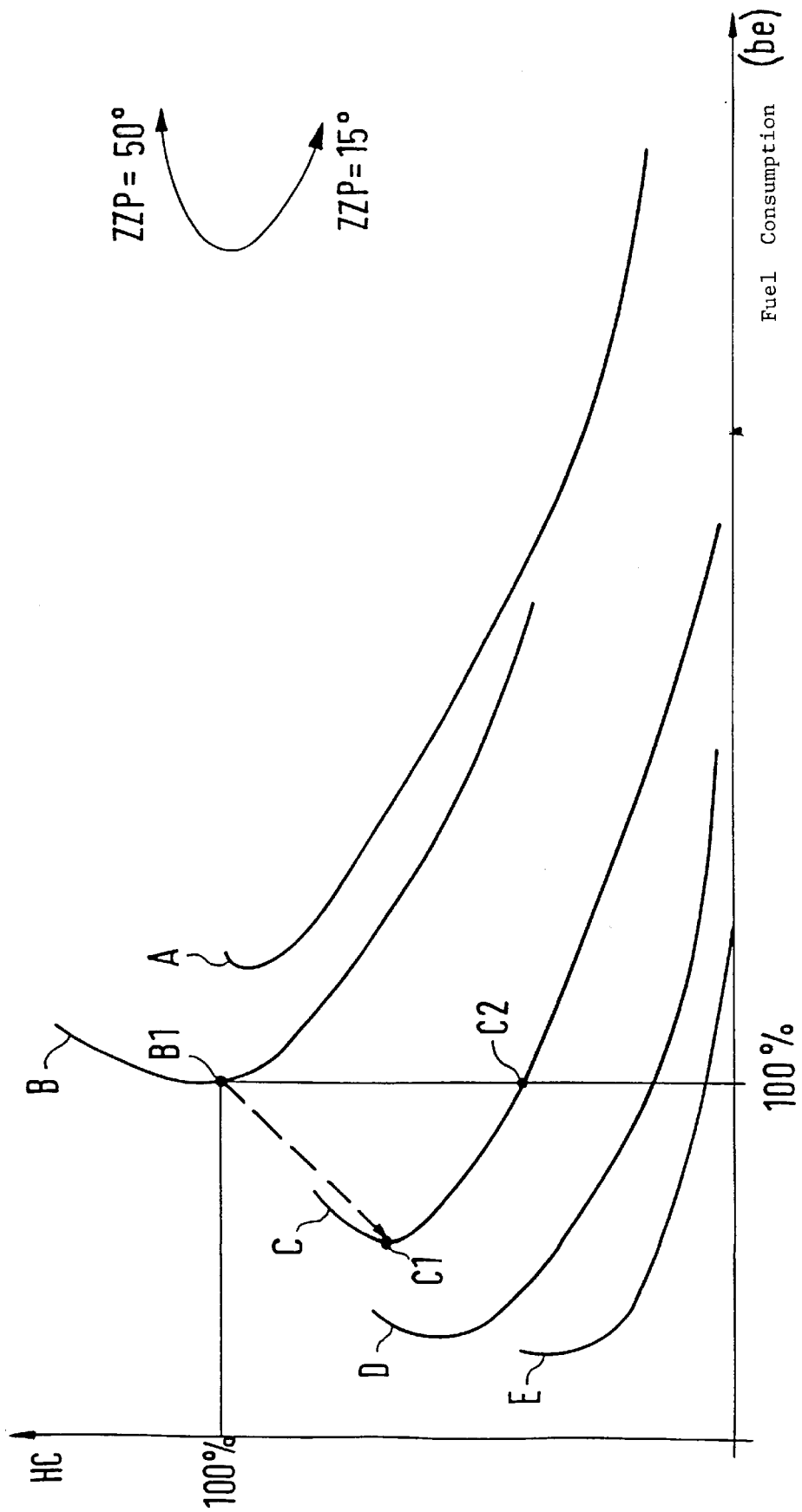
FIG. 3 is a graph of specific fuel consumption as well as HC emissions as a function of the exhaust camshaft setting.

Curves D and E shown in FIG. 3 indicate the influence of the additional adjustment of intake camshaft 3—curve D—and the additional reduction of the stroke of intake camshaft 3—curve E. Here again ignition timing point ZZP is adjusted for optimum reduction of specific HC emissions HC in such fashion that specific fuel consumption "be" remains essentially unchanged.

Figure 4:
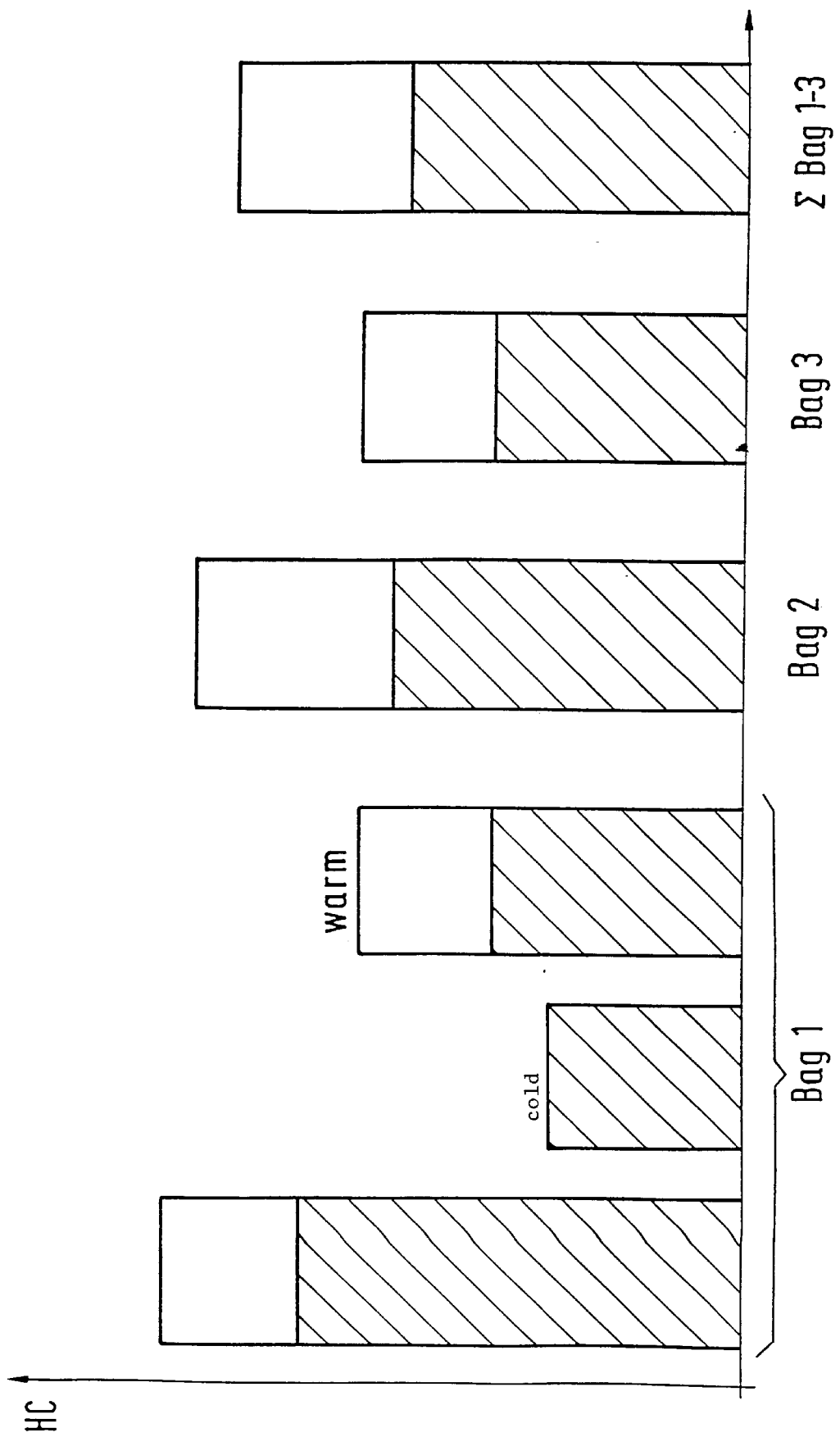
FIG. 4 is a graph of HC raw emissions with and without the use of the device according to the invention.

FIG. 4 shows, in the form of a graph, the influence of the above-described adjustment of exhaust camshaft 5 on the results of an FTP exhaust test. The shaded columns indicate the values of HC raw emissions HC following adjustment of exhaust camshaft 5 as described above by comparison with the non-shaded columns for operation without adjustment of exhaust camshaft 5. In this exhaust test, the exhaust from the vehicle is collected in three bags. Bag 1 contains both an exhaust component with engine 1 warmed up as well as an exhaust component with engine 1 cold. For bag 1, the left column shows the total emissions, the next column shows the percentage with engine 1 cold, and the third column shows the percentage with engine 1 warm.

Since the warm-up of engine 1 when engine 1 is cold as well as the special operating conditions of engine 1 take precedence during warm-up, the adjustment of exhaust camshaft 5 has no effect. In all other ranges, i.e. in the warm portions of bag 1, bag 2, and bag 3, however, the HC raw emissions can definitely be reduced by approximately 30%.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine having an exhaust camshaft, comprising:
    an adjustment device for the exhaust camshaft;
    an ignition device;
    a control device for controlling the adjustment device and the ignition device;
    wherein the control device retards the exhaust cam shaft in a partial load range of the internal combustion engine and retards an ignition timing point of the ignition device; and
    further wherein the control device retards the ignition timing point to a point where a specific fuel consumption before and after adjustment of the exhaust camshaft is essentially the same.

2. The internal combustion engine according to claim 1, further comprising another adjustment device for an intake camshaft, wherein the control device simultaneously advances the intake camshaft when the exhaust camshaft is retarded.

3. The internal combustion engine according to claim 1, further comprising a switching device for travel of the intake camshaft, wherein the control device simultaneously reduces a stroke of the intake camshaft when the exhaust camshaft is retarded.

4. The internal combustion engine according to claim 2, further comprising a switching device for travel of the intake camshaft, wherein the control device simultaneously reduces a stroke of the intake camshaft when the exhaust camshaft is retarded.

5. A method for operating an internal combustion engine, the method comprising the acts of:
    detecting a partial load range of the engine;
    controlling an adjusting device for an exhaust camshaft to retard the exhaust camshaft;
    controlling an ignition device to retard an ignition timing point of the ignition device; and wherein the control of the ignition device is set so that a specific fuel consumption is essentially the same before and after the adjustment of the exhaust camshaft.

6. The method according to claim 5, further comprising the act of: controlling another adjusting device for an intake camshaft to advance the intake camshaft.

7. The method according to claim 5, wherein, in addition to controlling the adjusting device for the exhaust camshaft to retard it, a switching device controls a stroke of an intake camshaft in order to reduce the stroke of the intake camshaft.

8. The method according to claim 6, wherein, in addition to controlling the adjusting device for the exhaust camshaft to retard it, a switching device controls a stroke of the intake camshaft in order to reduce the stroke of the intake camshaft.

* * * * *